Figure 1:
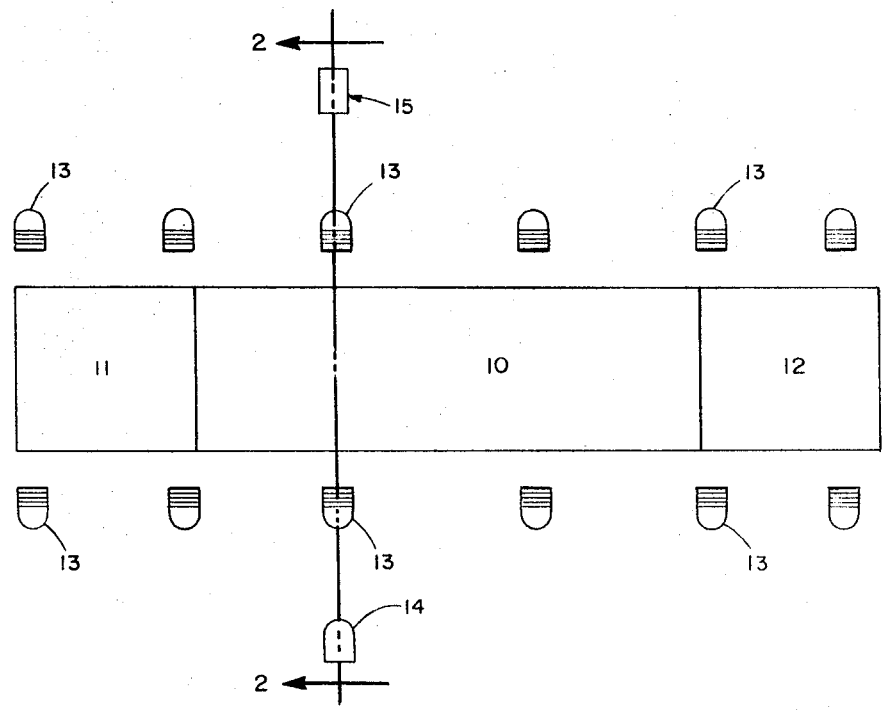

United States Patent

[11] 3,598,313

[72] Inventor  Milton Plattner
               Silver Spring, Md.
[21] Appl. No. 871,842
[22] Filed     Oct. 28, 1969
[45] Patented  Aug. 10, 1971
[73] Assignee  Fairchild Hiller Corporation
               Montgomery County, Md.

[54] FOG REMOVAL AND PREVENTION METHOD UTILIZING COOL DRY AIR
2 Claims, 2 Drawing Figs.

[52] U.S. Cl. ........................ 239/2 R, 239/14
[51] Int. Cl. ........................ E01n 13/00
[50] Field of Search ............... 239/2 R, 14; 62/93

[56]           References Cited
            UNITED STATES PATENTS
2,362,729  11/1944  Smith ................... 62/93
2,969,920   1/1961  Giannoni ............... 239/14
3,210,954  10/1965  Asker .................. 62/93

Primary Examiner—M. Henson Wood, Jr.
Assistant Examiner—John J. Love
Attorney—Michael W. York ABSTRACT: A method for removing or preventing fog that includes taking ambient air into the confined area of a cooling chamber and subjecting the air in the confined area to cooling to reduce the temperature of the air and injecting the air that has been subjected to temperature reduction into the atmosphere above the area that is to be cleared of fog.

PATENTED AUG 10 1971  3,598,313

INVENTOR

MILTON PLATTNER

BY *Michael W. York*

ATTORNEY

FOG REMOVAL AND PREVENTION METHOD UTILIZING COOL DRY AIR

This invention relates to fog removal and prevention methods and more particularly to fog removal and prevention methods in which relatively cool air is injected into the portion of the atmosphere that is to be cleared of or kept free of fog.

Fog is generally detrimental to many activities that require good visibility. For instance fog greatly hampers the safe and effective use of highways, parking lots, marinas, railway marshaling yards, aircraft carriers, and the like, and in particular aircraft runways.

Fog that is present over aircraft runways reduces visibility and is detrimental to the safe operation of aircraft on and over these runways and in many instances this fog requires the closing of the airport to incoming and outgoing air traffic, or results in the curtailing of flight operations. Due to the large numbers of incoming and outgoing flights that are handled by many airports the closing of an airport or curtailment of flight operations due to fog results in a serious disruption in air traffic and this causes inconveniences to passengers and greatly increases the costs associated with airfreight and air passenger services.

These detrimental effects of fog have been realized for some time and numerous attempts have been made to reduce or eliminate fog. On such attempt has involved the heating of fog-laden air and another attempt involved the injection of heated air into the area containing fog. Fog generally consists of a suspension of minute water droplets in air and since warm air has the capability of carrying a larger amount of water in the vapor state than cooler air it would normally be expected that the heating of fog-laden air would eliminate the fog. Similarly, it would normally be expected that the injection of heated air into a volume of fog-laden air would result in fog reduction by heat transfer from warm air into the cooler fog-laden air. However, in practice these methods of eliminating fog have not proven to be entirely satisfactory. One reason for the lack of success with these methods appears to be that warm air tends to rise and hence the warm air that does not contain fog does not stay immediately above the surface that is to be cleared of fog but rises and permits the cooler fog-laden air to come in and cover the facility that is to be freed of fog.

Other attempts at removing fog have included various methods and apparatus for causing the minute water droplets that form the fog to coalesce and form large droplets which precipitate to the ground under the action of gravity. Some of these methods and apparatus have used sonic waves to cause the water droplets to collide and coalesce. Other methods and apparatus have used ionized gases to create an electric field or used charged particles to promote coalescence. Various types of hygroscopic particles such as NaCl have also been injected into fog in an attempt to reduce fog by coalescence of the water droplets that form the fog. Unfortunately these attempts to remove fog have not been entirely successful and have not provided an effective system for removing fog over such facilities as aircraft runways and the like.

The method of this invention overcomes the difficulties associated with previous systems for fog removal and permits the effective removal or prevention of fog over aircraft runways and similar facilities.

It is therefore an object of the present invention to provide a method for removing or preventing fog.

Another object of the present invention is to provide a method that provides a volume of fog-free air that tends to remain near the surface of the facility that is being cleared of or is to be kept free of fog.

The present invention provides a method for removing or preventing fog in the atmosphere above an area of the earth that is desired to be cleared of or kept free of fog that includes taking ambient air into the confined area of a cooling chamber, cooling the ambient air in the cooling chamber to produce dry cool air at a temperature that will permit the dry cool air to be at a temperature below the temperature of the ambient air when the dry cool air is injected into the atmosphere and injecting the dry cool air into the atmosphere above the area of the earth that is desired to be cleared of or kept free of fog.

Figure 2:
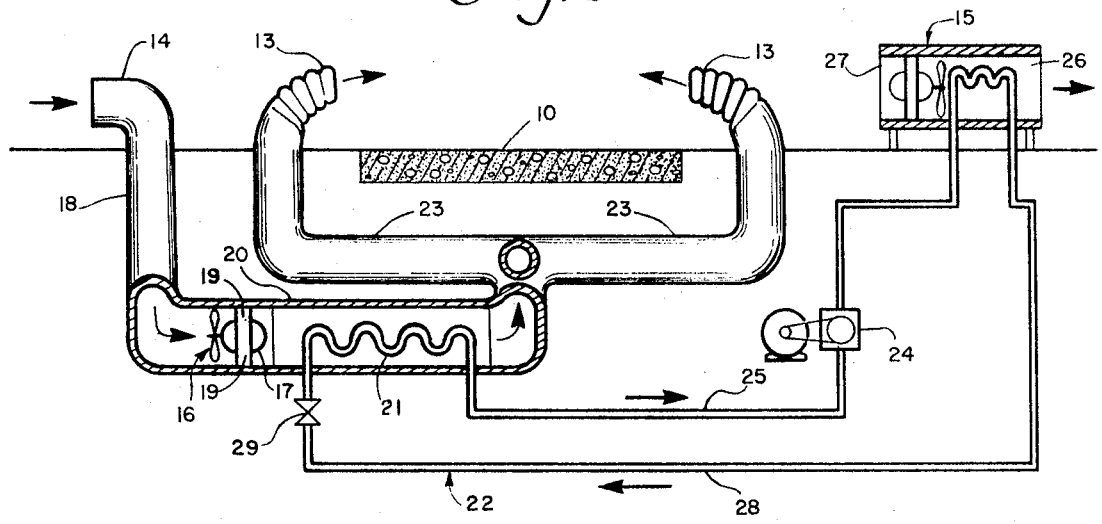

In order that the invention may be more clearly set forth and better understood, reference is made to the accompanying drawings in which:

FIG. 1 is a plan view of an aircraft runway embodying the features of the present invention; and FIG. 2 is a partial sectional view of the structure illustrated in FIG. 1 taken on the line 2-2 thereof.

Referring to the figures there is shown an aircraft runway area embodying the present invention. An aircraft runway 10 is shown including runway approaches 11 and 12 that are located at both ends of the runway. Located adjacent to and on both sides of the aircraft runway 10 and the runway approaches 11 and 12 are movable vents 13 for distributing processed air over the runway and runway approaches that are desired to be cleared of or kept free of fog. Located at a substantial distance away from the aircraft runway 10 and the associated runway approaches 11 and 12 is an ambient air intake 14. A heat-transfer unit 15 for transferring heat into the atmosphere is located at a substantial distance from the runway 10 and the runway approaches 11 and 12 on the opposite side of the runway from the air intake 14.

As best seen by referring to FIG. 2 ambient air is taken into the air intake 14 by the suction created by a fan blade 16 that is mounted on an intake fan motor 17 that is centrally located within the air intake tube 18 on struts 19 that connect the intake fan motor to the wall of the air intake tube. After the ambient air is taken into the air intake tube 18 it is introduced by the action of the fan blade 16 into the confined area of a cylindrical cooling chamber 20 that is connected at one end to the air intake tube and is passed through a series of cooling coils 21 that are located within the cooling chamber and are part of a cooling system 22. As the ambient air is passed through the series of cooling coils 21 heat is transferred from the ambient air to a coolant that is located within the cooling coils so that cooling of the ambient air is accomplished. This cooling causes moisture that is carried by the ambient air that was introduced into the cooling chamber to precipitate out to produce dry cool air that exits from the cooling chamber 20 that is cooler and drier than the ambient air that entered the cooling chamber. The dry cool air that leaves the cooling chamber 20 that is cooler and drier than the ambient air that entered the cooling chamber. The dry cool air that leaves the cooling chamber 20 is then passed by the action of the intake fan blade 16 through a manifold 23 that is connected to the cooling chamber to the series of movable vents 13 that are connected to the manifold and are located adjacent to and on both sides of the aircraft runway 10 and the associated landing approaches 11 and 12 and is injected through the vents into the atmosphere that is to be cleared of or kept free of fog that is above the aircraft runway and the runway approaches.

The best results the cross-sectional areas of the interiors of the cooling chamber 20, the manifold 23, and the movable vents 13 should be sufficiently large so that the cooling of the ambient air in the confined area of the cooling chamber, the transporting of the dry cool air that is produced in the cooling chamber through the manifold and the injecting of the dry cool air through the movable vents are accomplished without substantially compressing the ambient air or the dry cool air. This is necessary since any substantial compression of the air will generate heat and elevate the temperature of the air that is or has been subjected to being cooled in the cooling chamber and thus defeat the purpose of this invention which is to introduce dry cool air into the atmosphere above an area that is desired to be cleared of or kept free of fog.

When fog is present, the dry cool air that is injected into the atmosphere consisting of fog-laden air that is located above the aircraft runway 10 and the associated approaches 11 and 12 causes the fog to disperse by mixing with some of the fog-laden air and causing some of the visible water that forms the fog to be converted into invisible water vapor. This injected dry cool air also disperses the fog by physically replacing the moist fog-laden air. Since the dry cool air that is injected into the area above the aircraft runway 10 and the approaches 11 and 12 is denser than any surrounding warmer fog-laden air this dry cool air tends to remain over the runway and the approaches and prevents fog from forming over the runway and the approaches.

As indicated in FIG. 2 the cooling system 22 has a compressor 24 that compresses the coolant which is in its vapor phase, that is fed to the compressor from the cooling coils 21 through the connecting pipe 25 and into a series of condenser coils 26 and this generates heat. This heat of compression is then removed from the cooling system 22 by means of the heat-transfer unit 15 that includes a cooling fan 27 that blows air over the condenser coils 26 and this causes the coolant to condense into a liquid. This liquid coolant is then fed from the condenser coils 26 through an interconnecting pipe 28 to an expansion valve 29 where the liquid coolant is permitted to expand into a vapor within the cooling coils 21 resulting in the transfer of heat from the air in the cooling chamber to the coolant that is being vaporized in the cooling coils.

The heated air that results from the air being blown across the condenser coils 26 can be directed to the atmosphere or if desired it can be used to heat building or form some other useful purpose. If the heated air is directed to the atmosphere it is important that the heat be injected into the atmosphere at a point that is a substantial distance away from the area that is to be cleared or kept free of fog. If desired the cooling fan 27 can be replaced by some suitable heat sink such as a body of cold water. If a body of water is used, the condenser coils 26 are immersed in the cold water. A variety of coolants that can be used with this type of cooling system including $NH_3$, $SO_2$, $CH_3CL$ and the like.

It is important that the dry cool air that is injected into the atmosphere above the aircraft runway 10 and the approaches 11 and 12 be at the proper temperature for satisfactory results in removing or preventing fog. Preferably, the cooling of the ambient air in the confined area of the cooling chamber 20 should be carried out so that the resulting dry cool air that is produced is at a temperature that will permit the dry cool air to be at a temperature of about 3°F. to about 10°F. below the temperature of the ambient air when the dry cool air is injected into the atmosphere above the area such as the runway 10 and approaches 11 and 12 that is desired to be cleared of or kept free of fog. Proper temperature control can be achieved by controlling the intake fan motor 17, the compressor 24 and the cooling fan 27. Generally to achieve proper temperature control, the temperature of the dry cool air as it immediately leaves the cooling chamber 20 will have to be lower than the temperature that the dry cool air is desired to be at when it is injected into the atmosphere through the movable vents 13 since some heating of the dry cool air will probably take place in the manifold 13 due to heat transfer to the dry cool air through the manifold walls.

If it is desired to keep the area above the runway and the approaches continuously free of fog then the fan motor 17 and the cooling system 22 should be operated continuously during the time that fog conditions are present so that cold dry air is continuously injected into the area above the runway 10 and the approaches 11 and 12. If it is desired to automatically prevent fog from being formed by the use of this invention the intake fan motor 17 and the cooling system 22 can be connected to a suitable data processor (not shown) that controls the motor and the cooling system and evaluates data from temperature, dew point and wind sensors (not shown) that sense the conditions of the ambient air so that the intake fan motor and the cooling system are put into operation to prevent fog when the sensors indicate that fog conditions are likely to occur.

This invention is suitable for removing or preventing fog in the atmosphere over a variety of facilities as well as aircraft runways. This invention can also be used to remove or prevent fog over highways, marinas, railway marshaling yards, or any area of the earth by injecting the dry cool air in the manner previously described into the atmosphere above the area of the earth that is desired to be cleared of or kept free of fog.

Although the invention has been described in considerable detail with reference to certain preferred embodiments, it will be understood that variations and modifications may be made within the spirit and scope of the invention as defined in the appended claims.

What I claim is:

1. A method for removing or preventing fog in the atmosphere above an area of the earth that is desired to be cleared of or kept free of fog comprising the steps of introducing ambient air into a confined area, cooling said ambient air in said confined area to produce dry cool air at a temperature that will permit said dry cool air to be at a temperature about 3°F. to about 10°F. below the temperature of said ambient air when said dry cool air is injected into said atmosphere and injecting said dry cool air at a temperature about 3°F. to about 10°F. below the temperature of said ambient air into said atmosphere above the area of the earth that is desired to be cleared of or kept free of fog.

2. The method of claim 1 wherein said steps of cooling said ambient air in said confined area and injecting said dry cool air into said atmosphere are accomplished without substantially compressing said ambient air or said dry cool air.